(12) United States Patent
Hamamori et al.

(10) Patent No.: US 10,121,595 B2
(45) Date of Patent: Nov. 6, 2018

(54) MULTILAYER CERAMIC ELECTRONIC COMPONENT

(71) Applicant: Murata Manufacturing Co., Ltd., Nagaokakyo-shi, Kyoto-fu (JP)

(72) Inventors: Nobuyasu Hamamori, Nagaokakyo (JP); Hiroshi Asano, Nagaokakyo (JP); Yoshiyuki Nomura, Nagaokakyo (JP); Koji Matsushita, Nagaokakyo (JP); Ichitaro Okamura, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 0 days.

(21) Appl. No.: 15/708,469

(22) Filed: Sep. 19, 2017

(65) Prior Publication Data
US 2018/0082787 A1 Mar. 22, 2018

(30) Foreign Application Priority Data
Sep. 20, 2016 (JP) .................................. 2016-183318

(51) Int. Cl.
| *H01G 4/30* | (2006.01) |
| *H01G 4/232* | (2006.01) |
| *H01G 4/005* | (2006.01) |
| *H01G 4/12* | (2006.01) |
| *H01G 4/14* | (2006.01) |

(52) U.S. Cl.
CPC .............. *H01G 4/30* (2013.01); *H01G 4/005* (2013.01); *H01G 4/12* (2013.01); *H01G 4/14* (2013.01); *H01G 4/232* (2013.01)

(58) Field of Classification Search
CPC ............ H01G 4/30; H01G 4/005; H01G 4/12; H01G 4/14; H01G 4/232
See application file for complete search history.

(56) References Cited

U.S. PATENT DOCUMENTS

| 6,171,644 | B1* | 1/2001 | Jinno | .................... H01C 1/034 29/25.41 |
| 2007/0047179 | A1* | 3/2007 | Izu | ........................ H01G 9/012 361/523 |

FOREIGN PATENT DOCUMENTS

JP 2010-109238 A 5/2010

OTHER PUBLICATIONS

Asano et al., "Multilayer Ceramic Electronic Component," U.S. Appl. No. 15/708,462, filed Sep. 19, 2017.
(Continued)

*Primary Examiner* — Dion R Ferguson
(74) *Attorney, Agent, or Firm* — Keating & Bennett, LLP (57) ABSTRACT

A multilayer ceramic electronic component includes a first plating layer in contact with a first organic layer and a second plating layer in contact with a second organic layer. When the first organic layer disposed on a first base electrode layer located on a first principal surface or a second principal surface, or the second organic layer disposed on a second base electrode layer located thereon, is referred to as an organic layer principal surface portion, and when the first organic layer disposed on the first base electrode layer located on a first end surface or a second end surface, or the second organic layer disposed on the second base electrode layer located thereon, is referred to as an organic layer end surface portion, the surface roughness of the organic layer end surface portion is larger than the surface roughness of the organic layer principal surface portion.

20 Claims, 4 Drawing Sheets

(56) References Cited

OTHER PUBLICATIONS

Asano et al., "Multilayer Ceramic Electronic Component," U.S. Appl. No. 15/708,464, filed Sep. 19, 2017.
Asano et al., "Multilayer Ceramic Electronic Component," U.S. Appl. No. 15/708,474, filed Sep. 19, 2017.
Asano et al., "Multilayer Ceramic Electronic Component and Manufacturing Method Therefor," U.S. Appl. No. 15/708,476, filed Sep. 19, 2017.

* cited by examiner

MULTILAYER CERAMIC ELECTRONIC COMPONENT

CROSS REFERENCE TO RELATED APPLICATIONS

This application claims the benefit of priority to Japanese Patent Application No. 2016-183318 filed on Sep. 20, 2016. The entire contents of this application are hereby incorporated herein by reference.

BACKGROUND OF THE INVENTION

1. Field of the Invention

The present invention relates to a multilayer ceramic electronic component such as a capacitor, an inductor, and a resistor.

2. Description of the Related Art

Conventionally, multilayer ceramic electronic components such as capacitors, inductors, and resistors have been used for various electronic devices.

In general, these electronic components each have two principal surfaces opposite in the laminating direction, two side surfaces opposite in the width direction perpendicular to the laminating direction, and two end surfaces opposite in the length direction perpendicular to the laminating direction and the width direction.

Two or more external electrodes are provided on the outer surface of the laminated body. The external electrodes are each formed on the end surfaces and parts of the principal surfaces, the end surfaces and parts of the side surfaces, or the end surfaces and parts of the side surfaces and principal surfaces. The external electrodes have a substantially U-shaped or substantially L-shaped cross section in the laminating direction.

Such a multilayer ceramic electronic component is mounted on a substrate by electrically connecting parts of the respective external electrodes, formed mainly on the principal surfaces or the side surfaces, to lands of a substrate with a joint material such as a solder interposed therebetween.

However, when the substrate of the mounted structure is warped by a thermal shock or the like, a stress based on the warp propagates, through the lands, the joint material, and the external electrodes, to the laminated body, thus causing the ceramic portion and the internal electrode portion of the laminated body to have cracks, deformations, or the like generated. As a result, this will cause a decrease in performance or a decrease in reliability in the multilayer ceramic electronic component.

Therefore, Japanese Patent Application Laid-Open No. 2010-109238 discloses wraparound parts of external terminal electrodes respectively provided with leading-end spaced parts spaced from principal surfaces of a ceramic body, in order to prevent the ceramic body from being cracked by the stress mentioned previously.

However, the wraparound parts of the external terminal electrodes in Japanese Patent Application Laid-Open No. 2010-109238 respectively have base end-side joint parts joined to the principal surfaces of the ceramic body. Accordingly, there is concern that the stress will propagate to the ceramic body through the base end-side joint parts and the external terminal electrodes, and it has been difficult to suppress cracks adequately.

SUMMARY OF THE INVENTION

Preferred embodiments of the present invention provide multilayer ceramic electronic components which, when a substrate is warped by a thermal shock or the like with a component mounted on the substrate, significantly reduce or prevent propagation of a stress due to warping of a laminated body, thus preventing cracks.

A multilayer ceramic electronic component according to a preferred embodiment of the present invention includes: a laminated body including a plurality of dielectric layers laminated and a plurality of internal electrodes laminated, and including a first principal surface and a second principal surface opposite in a laminating direction, a first side surface and a second side surface opposite in a width direction perpendicular to the laminating direction, and a first end surface and a second end surface opposite in a length direction perpendicular to the laminating direction and the width direction; a first external electrode connected to the internal electrodes, and disposed on the first end surface, with an end extending on the first principal surface, the second principal surface, the first side surface, and the second side surface; and a second external electrode connected to the internal electrodes, and disposed on the second end surface, with an end extending on the first principal surface, the second principal surface, the first side surface, and the second side surface, the first external electrode including a first base electrode layer including a conductive metal and a glass component, a first organic layer including an organic silicon compound, disposed to cover the first base electrode layer, and a first plating layer disposed on the first organic layer, the second external electrode including a second base electrode layer including a conductive metal and a glass component, a second organic layer including an organic silicon compound, disposed to cover the second base electrode layer, and a second plating layer disposed on the second organic layer, the first organic layer disposed to cover from the first base electrode layer to at least a portion of the surface of the laminated body, and the second organic layer disposed to cover from the second base electrode layer to at least a portion of a surface of the laminated body, a leading end of the first plating layer in contact with the first organic layer, and a leading end of the second plating layer in contact with the second organic layer, and when the first organic layer disposed on the first base electrode layer located on the first principal surface or the second principal surface, or the second organic layer disposed on the second base electrode layer located thereon, is referred to as an organic layer principal surface portion, and the first organic layer disposed on the first base electrode layer located on the first end surface or the second end surface, or the second organic layer disposed on the second base electrode layer located thereon, is referred to as an organic layer end surface portion, a surface roughness of the organic layer end surface portion is larger than a surface roughness of the organic layer principal surface portion.

In addition, in a multilayer ceramic electronic component according to a preferred embodiment of the present invention, preferably, the organic layer principal surface portion has a surface roughness Ra of about 0.1 μm or more and about 0.5 μm or less, and the organic layer end surface portion has a surface roughness Ra of about 0.6 μm or more and about 2.0 μm or less.

Furthermore, in a multilayer ceramic electronic component according to a preferred embodiment of the present invention, preferably, an adhesion strength between the laminated body and the first base electrode layer is higher than an adhesion strength between the first organic layer and the first plating layer, and an adhesion strength between the laminated body and the second base electrode layer is higher than an adhesion strength between the second organic layer and the second plating layer.

In addition, in a multilayer ceramic electronic component according to a preferred embodiment of the present invention, preferably, the adhesion strength between the laminated body and the first organic layer is higher than the adhesion strength between the first organic layer and the first plating layer, and the adhesion strength between the laminated body and the second organic layer is higher than the adhesion strength between the second organic layer and the second plating layer.

Furthermore, in a multilayer ceramic electronic component according to a preferred embodiment of the present invention, the first organic layer and the second organic layer each preferably include an organic silicon compound that has a structure of multifunctional alkoxysilane Si—$(C_nH_{2n+1})_3$, and includes an N element.

In addition, in a multilayer ceramic electronic component according to a preferred embodiment of the present invention, an atomic concentration ratio of Si to Cu is preferably about 1% or more and about 5% or less between a Cu concentration and an Si concentration at the surfaces of the first organic layer and the second organic layer.

Furthermore, in a multilayer ceramic electronic component according to a preferred embodiment of the present invention, the multilayer ceramic electronic component is preferably a multilayer ceramic capacitor.

In accordance with a multilayer ceramic electronic component according to a preferred embodiment of the present invention, the first organic layer is disposed to cover from the first base electrode layer to at least a portion of the surface of the laminated body, and the second organic layer is disposed to cover from the second base electrode layer to at least a portion of the surface of the laminated body, the first plating layer includes a leading end in contact with the first organic layer, and the second plating layer includes a leading end in contact with the second organic layer, and when the first organic layer disposed on the first base electrode layer located on the first principal surface or the second principal surface, or the second organic layer disposed on the second base electrode layer located thereon, is referred to as an organic layer principal surface portion, and the first organic layer disposed on the first base electrode layer located on the first end surface or the second end surface, or the second organic layer disposed on the second base electrode layer located thereon, is referred to as an organic layer end surface portion, the surface roughness of the organic layer end surface portion is larger than the surface roughness of the organic layer principal surface portion. Thus, delamination from the first organic layer is more likely to be caused around a portion from a leading end of the first base electrode layer to the first base electrode layer provided on the principal surface of the laminated body, and the adhesion force between the first base electrode layer and the first organic layer is enhanced by an anchor effect in the case of the first external electrode on the first end surface. Likewise, delamination from the second organic layer is more likely to be caused around a portion from a leading end of the second base electrode layer to the second base electrode layer provided on the principal surface of the laminated body, and the adhesion force between the second base electrode layer and the second organic layer is enhanced by an anchor effect in the case of the second external electrode on the second end surface. Therefore, delamination is made less likely to be caused between the first base electrode layer and the first organic layer and between the second base electrode layer and the second organic layer on the end surfaces. As a result, the fixing strength between the first external electrode and the second external electrode is ensured, thus making it possible to prevent falling of the multilayer ceramic capacitor after being mounted.

In addition, in accordance with a multilayer ceramic electronic component according to a preferred embodiment of the present invention, when the organic layer principal surface portion has a surface roughness Ra of about 0.1 μm or more and about 0.5 μm or less, and the organic layer end surface portion has a surface roughness Ra of about 0.6 μm or more and about 2.0 μm or less, it becomes possible to ensure the fixing strength of the first external electrode and the second external electrode provided on the end surfaces of the laminated body while reducing, in a more reliable manner, the adhesion of the first base electrode layer and the first plating layer as well as the second base electrode layer and the second plating layer provided on the principal surfaces of the laminated body, thus further achieving the effects of improving the reliability and preventing a fall of the multilayer ceramic capacitor.

Furthermore, in accordance with a multilayer ceramic electronic component according to a preferred embodiment of the invention, when the adhesion strength between the laminated body and the first base electrode layer is higher than the adhesion strength between the first organic layer and the first plating layer, and the adhesion strength between the laminated body and the second base electrode layer is higher than the adhesion strength between the second organic layer and the second plating layer, defects are further reduced, such as a decrease in the reliability of the multilayer ceramic electronic component.

In addition, in accordance with a multilayer ceramic electronic component according to a preferred embodiment of the present invention, when the adhesion strength between the laminated body and the first organic layer is higher than the adhesion strength between the first organic layer and the first plating layer, and the adhesion strength between the laminated body and the second organic layer is higher than the adhesion strength between the second organic layer and the second plating layer, if a substrate is warped by a thermal shock or the like with the multilayer ceramic electronic component mounted on the substrate, a stress based on the warp can cause delamination between the first base electrode layer and the first plating layer of the first external electrode, and likewise, delamination between the second base electrode layer and the second plating layer of the second external electrode in a more rational manner. Therefore, the stress is further dispersed, thus making it possible to further prevent the ceramic portion and the internal electrode portion of the multilayer ceramic electronic component from having any crack, deformation, or the like generated. As a result, the reliability of the multilayer ceramic electronic component is further improved.

Furthermore, in accordance with a multilayer ceramic electronic component according to a preferred embodiment of the present invention, when the first organic layer and the second organic layer have an organic silicon compound that includes a structure of multifunctional alkoxysilane Si—$(C_nH_{2n+1})_3$ and includes an N element, the layers are reliably defined on the surfaces of the laminated body, the first base electrode layer of the first external electrode, and the like, thus improving the reliability.

In addition, in accordance with a multilayer ceramic electronic component according to a preferred embodiment of the present invention, when the atomic concentration ratio of Si to Cu is about 1% or more and about 5% or less between the Cu concentration and the Si concentration at the surfaces of the first organic layer and the second organic layer, the ceramic portion and the internal electrode portion of the multilayer ceramic electronic component are not only prevented from having any cracks, deformation, or the like generated, but also prevent defective plating as well as deviations of the multilayer ceramic electronic component.

According to preferred embodiments of the present invention, the ceramic portion and the internal electrode portion of the laminated body are prevented from having any crack, deformation, or the like generated, thus improving the performance and reliability of the multilayer ceramic electronic components.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Multilayer ceramic electronic components according to preferred embodiments of the present invention will be described in detail below with reference to the drawings. It is to be noted that multilayer ceramic capacitors will be described as examples of the multilayer ceramic electronic components in the following preferred embodiments. Further, like or corresponding elements are denoted by like symbols in the figures, but the descriptions of the portions will not be repeated.

Figure 1:
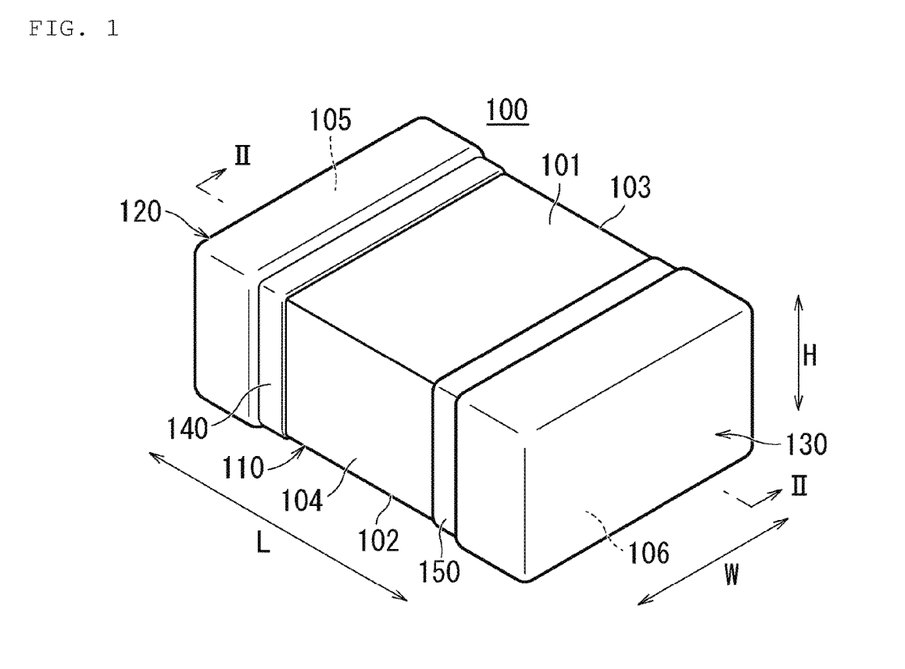
FIG. 1 is a perspective view illustrating an appearance of a multilayer ceramic electronic component according to a preferred embodiment of the present invention.
Figure 2:
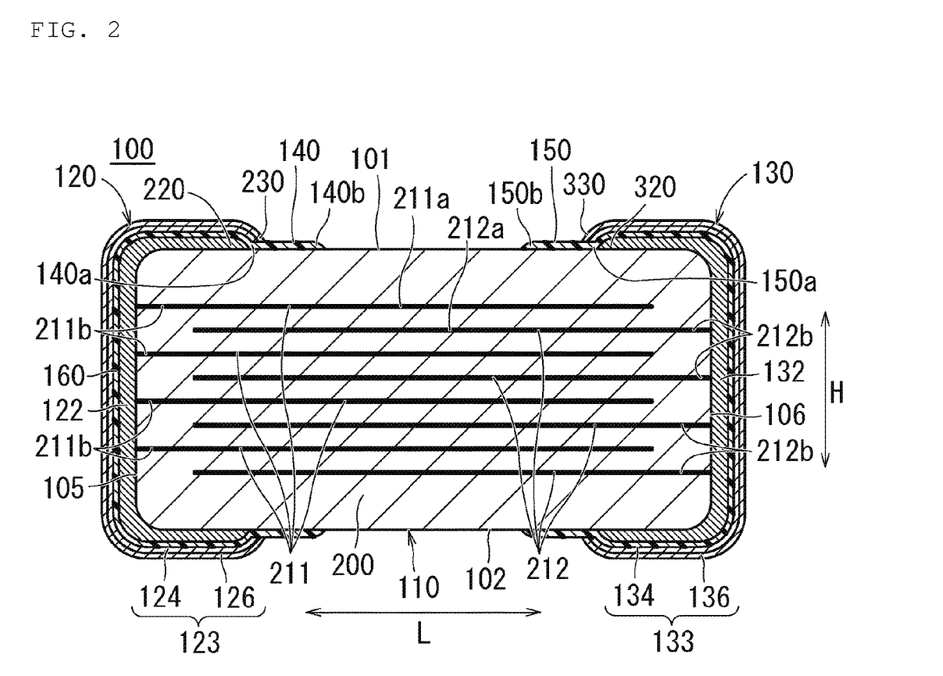
FIG. 2 is a cross-sectional view of a multilayer ceramic electronic component according to a preferred embodiment of the present invention, as viewed from the direction of an arrow along line II-II in FIG. 1.
Figure 3:
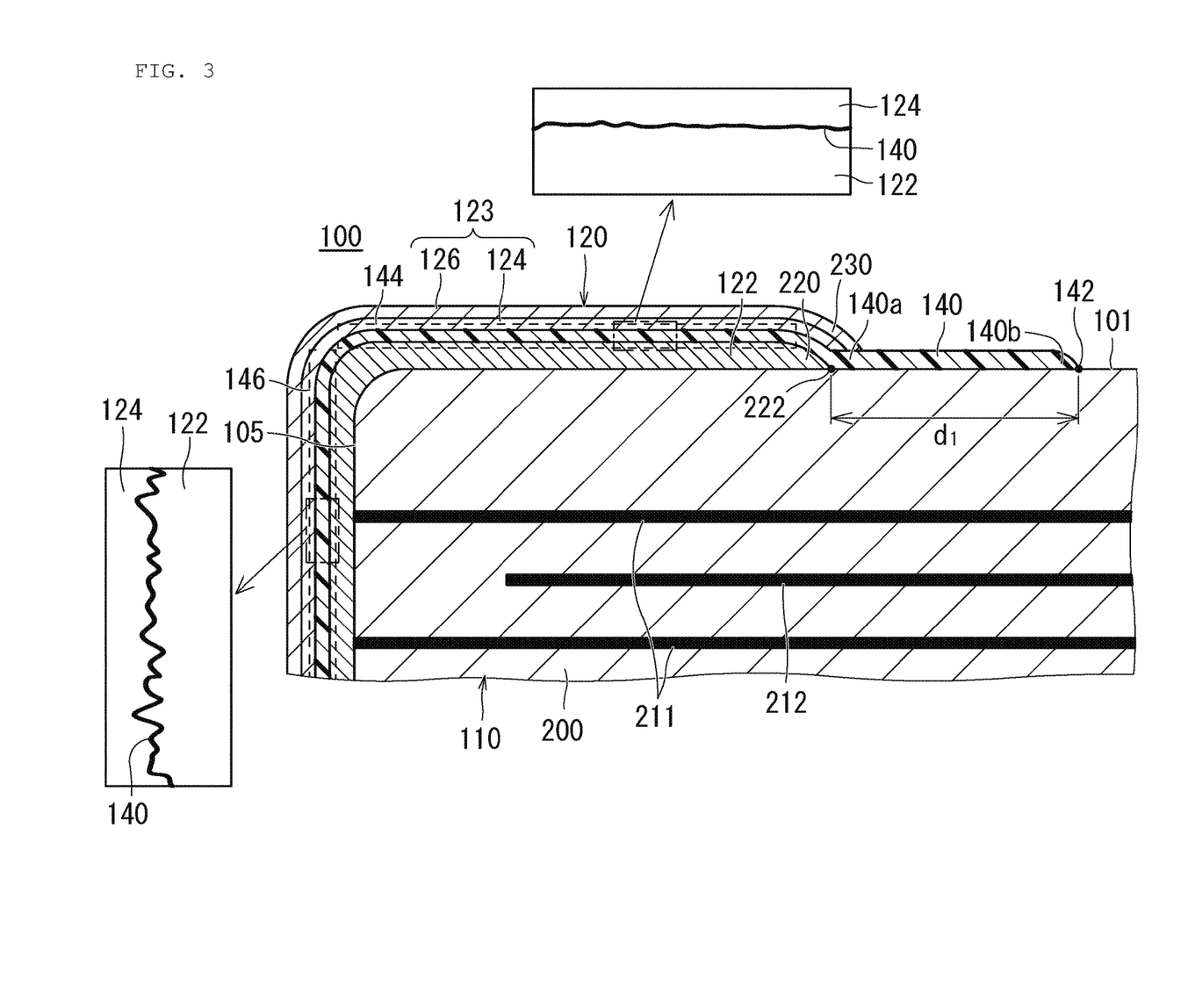
FIG. 3 is a cross-sectional view of a multilayer ceramic electronic component according to a preferred embodiment of the present invention, which is a partially enlarged view of an external electrode in FIG. 2.

FIG. 1 is a perspective view illustrating an appearance of a multilayer ceramic capacitor according to a preferred embodiment of the present invention. FIG. 2 is a cross-sectional view of the multilayer ceramic capacitor according to the present preferred embodiment, as viewed from the direction of an arrow along line II-II in FIG. 1. FIG. 3 is a cross-sectional view of the multilayer ceramic electronic component according to the present preferred embodiment, which is a partially enlarged view of an external electrode in FIG. 2.

The multilayer ceramic capacitor 100 according to a preferred embodiment of the present invention preferably has a cuboid shape, where the dimension in a length direction L to be described is larger than the dimension in a width direction W to be described. The cuboid shape encompasses the multilayer ceramic capacitor 100 which has corners and ridges rounded, and the multilayer ceramic capacitor 100 which has surfaces provided with difference in level or unevenness.

The multilayer ceramic capacitor 100 preferably includes a laminated body 110, a first external electrode 120, and a second external electrode 130.

The laminated body 110 includes a first principal surface 101 and a second principal surface 102 opposite in the laminating direction H of a plurality of dielectric layers, a first side surface 103 and a second side surface 104 opposite in the width direction W perpendicular to the laminating direction H, and a first end surface 105 and a second end surface 106 opposite in the length direction L perpendicular to both the laminating direction H and the width direction W.

In this regard, the direction of stacking the dielectric layers of the laminated body 110 is defined as the laminating direction H, the direction of connecting the first external electrode 120 and the second external electrode 130 of the multilayer ceramic capacitor 100, among directions perpendicular to the laminating direction H, is defined as the length direction L of the laminated body 110, and the direction perpendicular to both the laminating direction H and the length direction L is defined as the width direction W of the laminated body 110, and these terms will be in the following description.

The laminated body 110 includes the plurality of dielectric layers 200 and a plurality of internal electrodes that are laminated alternately. The laminated body 110 preferably has a cuboid shape. The laminating direction H of the plurality of dielectric layers 200 and the plurality of internal electrodes corresponds with the height direction.

The laminated body 110 preferably includes a plurality of first internal electrodes 211 and a plurality of second internal electrodes 212 that are arranged alternately in different layers.

The first internal electrodes 211 each have, as viewed from the laminating direction H, a rectangular or substantially rectangular first opposite portion 211a, and a first extended portion 211b extended from the first opposite portion 211a to the first end surface 105 of the laminated body 110. The first extended portion 211b includes an end surface exposed at the first end surface 105.

The second internal electrodes 212 each have, as viewed from the laminating direction H, a rectangular or substantially rectangular second opposite portion 212a, and a second extended portion 212b extended from the second opposite portion 212a to the second end surface 106 of the laminated body 110. The second extended portion 212b has an end surface exposed at the second end surface 106.

As shown in FIG. 2, the first opposite portions 211a of the first internal electrodes 211 and the second opposite portions 212a of the second internal electrodes 212 generate electrostatic capacitance with the dielectric layers 200 interposed therebetween.

The dielectric layers 200 are preferably made from, for example, a dielectric ceramic material containing, as its main constituent, $BaTiO_3$, $CaTiO_3$, $SrTiO_3$, $CaZrO_3$, $PbTiO_3$, $Pb(Zr,Ti)O_3$, or the like. In addition, the dielectric layers 200 may include, as accessory constituents, an Mn compound, an Fe compound, a Cr compound, a Co compound, an Ni compound, or the like. The dielectric layers 200 are preferably about 0.5 μm or more and about 10 μm or less in thickness, for example.

The first internal electrodes 211 and the second internal electrodes 212 can be made of, for example, appropriate conductive materials such as metals, e.g., Ni, Cu, Ag, Pd, or Au, alloys (e.g., Ag—Pd alloys) containing at least one of the metals. The first internal electrodes 211 and the second internal electrodes 212 are each preferably about 0.1 μm or more and about 2.0 μm or less in thickness, for example.

The first external electrode 120 is disposed on the first end surface 105 of the laminated body 110, with ends extending on the first principal surface 101 and the second principal surface 102 as well as the first side surface 103 and the second side surface 104. The first external electrode 120 is electrically connected to the first internal electrodes 211.

The second external electrode 130 is disposed on the second end surface 106 of the laminated body 110, with ends extending on the first principal surface 101 and the second principal surface 102 as well as the first side surface 103 and the second side surface 104. The second external electrode 130 is electrically connected to the second internal electrodes 212. The first external electrode 120 and the second external electrode 130 are spaced from each other in the length direction L of the laminated body 110.

The first external electrode 120 preferably includes a first base electrode layer 122 including a conductive metal and a glass component, a first organic layer 140 including an organic silicon compound, disposed to cover the first base electrode layer 122, and a first plating layer 123 disposed on the first organic layer 140. Likewise, the second external electrode 130 preferably includes a second base electrode layer 132 including a conductive metal and a glass component, a second organic layer 150 including an organic silicon compound, disposed to cover the second base electrode layer 132, and a second plating layer 133 disposed on the second organic layer 150.

The first base electrode layer 122 is disposed on the first end surface 105 of the laminated body 110, and defined such that ends extend on the first principal surface 101 and the second principal surface 102 as well as the first side surface 103 and the second side surface 104.

The second base electrode layer 132 is disposed on the second end surface 106 of the laminated body 110, and defined such that ends extend on the first principal surface 101 and the second principal surface 102 as well as the first side surface 103 and the second side surface 104.

The first base electrode layer 122 and the second base electrode layer 132 are preferably formed by, for example, applying a conductive paste including a conductive metal and a glass component, and baking the paste. For example, Cu, Ni, Ag, Pd, an Ag—Pd alloy, Au, or the like is preferably used as the conductive metal for the first base electrode layer 122 and the second base electrode layer 132. For example, glass containing B, Si, Ba, Mg, Al, Li, or the like is preferably used as the glass component for the first base electrode layer 122 and the second base electrode layer 132.

The first base electrode layer 122 and the second base electrode layer 132 are obtained by co-firing with the internal electrodes, or obtained by applying a conductive paste to the surface of the fired laminated body 110, and baking the paste. The first base electrode layer 122 and the second base electrode layer 132 are each preferably about 10 μm or more and about 50 μm or less in the thickness of the thickest portion, for example.

The first plating layer 123 preferably covers the first organic layer 140 disposed on the first base electrode layer 122. Specifically, the first plating layer 123 is preferably disposed on the first organic layer 140 disposed on the first end surface 105 of the laminated body 110 and extended therefrom to the first organic layer 140 disposed on the first principal surface 101, the second principal surface 102, the first side surface 103, and the second side surface 104 of the laminated body 110.

The second plating layer 133 preferably covers the second organic layer 150 disposed on the second base electrode layer 132. Specifically, the second plating layer 133 is preferably disposed on the second organic layer 150 disposed over the second end surface 106 of the laminated body 110 and extended therefrom to the second organic layer 150 disposed on the first principal surface 101, the second principal surface 102, the first side surface 103, and the second side surface 104 of the laminated body 110.

The first plating layer 123 and the second plating layer 133 are preferably made from, for example, at least one selected from Cu, Ni, Ag, Pd, Ag—Pd alloy, Au, Sn, and the like.

The first plating layer 123 may include multiple layers, preferably a two-layer structure of an Ni plating layer 124 and an Sn plating layer 126. The second plating layer 133 may include multiple layers, preferably a two-layer structure of an Ni plating layer 134 and an Sn plating layer 136. The plating layer is preferably about 1 μm or more and about 15 μm or less in thickness per layer, for example.

The Ni plating layer 124 of the first plating layer 123 is preferably provided to cover the first organic layer 140 that covers the surface of the first base electrode layer 122 of the first external electrode 120. Thus, the first organic layer 140 and the first base electrode layer 122 are prevented from being eroded by a solder in mounting the multilayer ceramic capacitor 100.

The Ni plating layer 134 of the second plating layer 133 is preferably provided to cover the second organic layer 150 that covers the surface of the second base electrode layer 132 of the second external electrode 130. Thus, the second organic layer 150 and the second base electrode layer 132 are prevented from being eroded by a solder in mounting the multilayer ceramic capacitor 100.

In addition, the Sn plating layer 126 is preferably further provided on the Ni plating layer 124 for the first external electrode 120, thus improving the solderability of the first external electrode 120. Likewise, the Sn plating layer 136 is preferably further provided on the Ni plating layer 134 for the second external electrode 130, thus improving the solderability of the second external electrode 130. As a result, it becomes easier to mount the multilayer ceramic capacitor 100.

The first organic layer 140 is disposed to cover the first base electrode layer 122 and extended therefrom to cover the surface of the laminated body 110. More specifically, the first organic layer 140 is disposed to cover an end 220 of the first base electrode layer 122. The portion of the first organic layer 140 in contact with the laminated body 110 is located closer to the first end surface 105 of the laminated body 110, and disposed on the first principal surface 101, the second principal surface 102, the first side surface 103, and the second side surface 104 so as to wrap around the surface of the laminated body 110. One end 140a of the portion of the first organic layer 140 in contact with the laminated body 110 makes contact to cover the end 220 of the first base electrode layer 122 of the first external electrode 120. The portion of the first organic layer 140 in contact with the laminated body 110 is disposed to extend from the end 220 of the first base electrode layer 122 even to at least a portion of the surface of the laminated body 110, and the other end 140b is located closer to the second end surface 106 than the end 230 of the first plating layer 123 and exposed. Furthermore, the end 230 of the first plating layer 123 of the first external electrode 120 preferably makes contact with the surface of one end 140a of the portion of the first organic layer 140 in contact with the laminated body 110.

The second organic layer 150 is disposed to cover the second base electrode layer 132 and extended therefrom, to cover the surface of the laminated body 110. More specifically, the second organic layer 150 is disposed to cover the end 320 of the second base electrode layer 132. The portion of the second organic layer 150 in contact with the laminated body 110 is located closer to the second end surface 106 of the laminated body 110, and disposed on the first principal surface 101, the second principal surface 102, the first side surface 103, and the second side surface 104 so as to wrap around the surface of the laminated body 110. One end 150a the portion of the second organic layer 150 in contact with the laminated body 110 makes contact so as to cover the end 320 of the second base electrode layer 132 of the second external electrode 130. The portion of the second organic layer 150 in contact with the laminated body 110 is disposed to extend from the end 320 of the second base electrode layer 132 even to at least a portion of the surface of the laminated body 110, and the other end 150b is located closer to the first end surface 105 than the end 330 of the second plating layer 133 and exposed. Furthermore, the end 330 of the second plating layer 133 of the second external electrode 130 preferably makes contact with the surface of one end 150a of the portion of the second organic layer 150 in contact with the laminated body 110.

In accordance with the foregoing structure, if a substrate is warped by a thermal shock or the like with the multilayer ceramic capacitor 100 mounted on the substrate, a stress based on the warp can cause delamination between the first base electrode layer 122 and the first plating layer 123 of the first external electrode 120 and delamination between the second base electrode layer 132 and the second plating layer 133 of the second external electrode 130. Therefore, the stress is dispersed, thus making it possible to keep the ceramic portion and the internal electrode portion of the multilayer ceramic capacitor 100 from having any cracks, deformation, or the like generated therein. As a result, the reliability of the multilayer ceramic capacitor 100 is improved. In this regard, the cracks are defined as cracking which develops from the outer layer portion toward the internal electrode layer portion with an external electrode end as a starting point.

As shown in FIG. 3, a portion of the first organic layer 140 in contact with the laminated body 110 preferably has a dimension $d_1$ (that is, a dimension in the length direction L from a leading end 222 of the first base electrode layer 122 to a leading end 142 of the first organic layer 140 closer to the second end surface 106) of about 5 μm or more and about 100 μm or less in the length direction L. It is to be noted that the same applies in the case of the second organic layer 150. Thus, delamination is able to be reliably achieved between the base electrode layers and the plating layers without causing problems such as defective soldering.

When the first organic layer 140 disposed on the first base electrode layer 122 located on the first principal surface 101 is referred to as an organic layer principal surface portion 144, and the first organic layer 140 disposed on the first base electrode layer 122 located on the first end surface 105 is referred to as an organic layer end surface portion 146, the surface roughness of the organic layer end surface portion 146 is larger than the surface roughness of the organic layer principal surface portion 144. It is to be noted that the same applies in the case of the second organic layer 150.

In addition, preferably, the organic layer principal surface portion 144 of the first organic layer 140 preferably has a surface roughness Ra of about 0.1 μm or more and about 0.5 μm or less, and the organic layer end surface portion 146 thereof preferably has a surface roughness Ra of about 0.6 μm or more and about 2.0 μm or less. It is to be noted that the same applies in the case of the second organic layer 150.

Further, here is an example method for measuring the surface roughness for the organic layer principal surface portion and the organic layer end surface portion in accordance with a preferred embodiment of the present invention.

(1) In the case of measuring the surface roughness before forming the plating layer: The organic layer principal surface portion is subjected to profilometry with the use of a laser microscope at a central portion of the first organic layer or the second organic layer located on the both principal surfaces or both side surfaces of the laminated body 110. The arithmetic mean roughness Ra is calculated with a reference length (measurement range) of 50 μm.

The organic layer end surface portion is subjected to profilometry with the use of a laser microscope at a central portion of the first organic layer or the second organic layer located on the both end surfaces of the laminated body 110. The arithmetic mean roughness Ra is calculated with a reference length (measurement range) of 50 μm.

(2) In the case of measuring the surface roughness in the multilayer ceramic capacitor with the plating layer formed: Cross-section polishing is carried out from the surface in a direction perpendicular to the substrate mounting surface, that is, the first side surface or the second side surface to a central portion (located at half the width W) of the multilayer ceramic capacitor, and an image of the polished cross section is captured with an SEM (electron microscope). Thereafter, the curve of the geometry between the organic layer and the plating layer is extracted from the captured image, and the arithmetic mean roughness Ra is calculated with a reference length (measurement range) of 50 μm.

The portion of the first organic layer 140, disposed on the laminated body 110, is preferably larger in thickness than the portion of the first organic layer 140 disposed on the first base electrode layer 122. Thus, delamination is able to be reliably achieved between the first base electrode layer 122 and the first plating layer 123. Likewise, the portion of the second organic layer 150, disposed on the laminated body 110, is preferably larger in thickness than the portion of the second organic layer 150 disposed on the second base electrode layer 132. Thus, delamination is able to be reliably achieved between the second base electrode layer 132 and the second plating layer 133. The portions of the first organic layer 140 and the second organic layer 150, disposed on the first principal surface 101 and the second principal surface 102 of the laminated body 110, are preferably about 5 nm or more and about 100 nm or less in thickness, for example. In addition, the first organic layer 140 on the end 220 of the first base electrode layer 122 (the portion in the location of the leading end) and the first organic layer 150 on the end 320 of the second base electrode layer 132 (the portion in the location of the leading end) are preferably each about 5 nm or more and about 500 nm or less in thickness, for example. Thus, the laminated body 110 is not only effectively prevented from being cracked, but defective plating as well as deviations of the multilayer ceramic capacitor 100 are also significantly reduced or prevented.

The first organic layer 140 and the second organic layer 150 preferably include an organic silicon compound. For example, decyltrimethoxysilane, n-propyltrimethoxysilane, octyltriethoxysilane, or the like is used as the organic silicon compound. In particular, the use of two types of: a monofunctional alkoxysilane structure; and a multifunctional alkoxysilane Si—$(C_nH_{2n+1})_3$ structure, as the first organic layer 140 and the second organic layer 150 can cause the portion of the first organic layer 140 in the location of the leading end of the first base electrode layer 122 and the portion of the second organic layer 150 in the location of the leading end of the first base electrode layer 132 to differ in thickness from the portion other than the portion in the location of the leading end of the first base electrode layer 122 and the portion other than the portion in the location of the leading end of the second base electrode layer 132. It is to be noted that an organic silicon compound that has a structure of multifunctional alkoxysilane Si—$(C_nH_{2n+1})_3$ and includes an N element may be used for the first organic layer 140 and the second organic layer 150.

Thus, if a substrate is warped by a thermal shock or the like with the multilayer ceramic capacitor 100 mounted on the substrate, a stress based on the warp can cause delamination between the first base electrode layer 122 and the first plating layer 123 of the first external electrode 120, and likewise, delamination between the second base electrode layer 132 and the second plating layer 133 of the second external electrode 130. Therefore, the stress is dispersed, thus making it possible to prevent the ceramic portion and the internal electrode portion of the multilayer ceramic capacitor 100 from having any crack, deformation, or the like generated. As a result, the reliability of the multilayer ceramic capacitor 100 can be improved.

In addition, there is a portion without any organic layer between the first external electrode 120 and the second external electrode 130 of the multilayer ceramic capacitor 100. Thus, because the surface of the laminated body 110 is exposed, the fixing strength with a conductive adhesive used in mounting is improved, thus making it possible to keep the mounting reliability from being decreased.

In addition, the adhesion strength between the first base electrode layer 122 of the first external electrode 120 and the laminated body 110 is preferably higher than the adhesion strength between the first organic layer 140 and the first plating layer 123 of the first external electrode 120. Likewise, the adhesion strength between the second base electrode layer 132 of the second external electrode 130 and the laminated body 110 is preferably higher than the adhesion strength between the second organic layer 150 and the second plating layer 133 of the second external electrode 130.

In addition, the adhesion strength between the laminated body 110 and the first organic layer 140 is preferably higher than the adhesion strength between the first organic layer 140 and the first plating layer 123. Likewise, the adhesion strength between the laminated body 110 and the second organic layer 150 is preferably higher than the adhesion strength between the second organic layer 150 and the second plating layer 133.

In addition, the atomic concentration ratios of Si to Cu are preferably about 1% or more and about 5% or less at the surfaces of the first organic layer 140 and the second organic layer 150. Thus, the ceramic portion and the internal electrode portion of the multilayer ceramic capacitor 100 not only prevent any cracks, deformation, or the like generated, but also significantly reduces or prevents defective plating as well as deviations of the multilayer ceramic capacitor 100.

In addition, the relational expression of A>B is preferably satisfied when the atomic concentration ratio of Si to Cu is denoted by B in the first organic layer 140 disposed on the first base electrode layer 122 located on the first end surface 105, the atomic concentration ratio of Si to Cu is denoted by A in the first organic layer 140 disposed on the first base electrode layer 122 located on the first principal surface 101 and the second principal surface 102, and the atomic concentration ratio of Si to Cu is denoted by A in the first organic layer 140 located directly on the first principal surface 101 and the second principal surface 102. Likewise, the relational expression of A>B is preferably satisfied when the atomic concentration ratio of Si to Cu is denoted by B in the second organic layer 150 disposed on the second base electrode layer 132 located on the second end surface 106, the atomic concentration ratio of Si to Cu is denoted by A in the second organic layer 150 disposed on the second base electrode layer 132 located on the first principal surface 101 and the second principal surface 102, and the atomic concentration ratio of Si to Cu is denoted by A in the second organic layer 150 located directly on the first principal surface 101 and the second principal surface 102. Thus, delamination of the first organic layer 140 and the second organic layer 150 is able to be stopped by the first side surface 103 and the second side surface 104, thus avoiding decreased reliability.

Further, the atomic concentration ratio of Si to Cu in the first organic layer 140 disposed on the first base electrode layer 122 located on the first side surface 103 and the second side surface 104 and the atomic concentration ratio of Si to Cu in the first organic layer 140 located directly on the first side surface 103 and the second side surface 104 preferably have the same value as A, and preferably satisfy the relational expression of A>B.

The atomic concentration ratios mentioned above are measured by XPS (X-ray photoelectron spectroscopy). More specifically, the atomic concentration ratios can be obtained by making a cut on the order of a 150 µm square at central portions of the chip side surface and the end surface, peeling the first plating layer 123 or the second plating layer 133 at the cut portions, applying an XPS (X-ray photoelectron spectroscopy) analysis to the surfaces, and calculating the atomic concentration ratios on the basis of the respective peak areas of Cu2p and Si2p and the sensitivity coefficient of the measurement system. In addition, here are detailed measurement conditions for the XPS.

System Name: VersaProbe from ULVAC-PHI
X-Ray: monochromatic Al-Kα Ray
X-Ray Diameter: 100 µm in Half-Power Beamwidth
Takeoff Angle of Photoelectron: 45°
Measured Spectra: Si2p, Cu2p
Compensation Method for Charging during Measurement: Irradiation with Electron Beams and Ion beams In the multilayer ceramic capacitor 100 according to the present preferred embodiment of the present invention, when the first organic layer 140 disposed on the first base electrode layer 122 located on the first principal surface 101 is referred to as an organic layer principal surface portion 144, and the first organic layer 140 disposed on the first base electrode layer 122 located on the first end surface 105 is referred to as an organic layer end surface portion 146, the surface roughness of the organic layer end surface portion 146 is larger than the surface roughness of the organic layer principal surface portion 144. Thus, delamination from the first organic layer 140 is more likely to be caused around a portion from the leading end 222 of the first base electrode layer 122 to the first base electrode layer 122 on the principal surface of the laminated body 110, and the adhesion force between the first base electrode layer 122 and the first organic layer 140 is able to be enhanced by an anchor effect in the case of the first external electrode 120 on the first end surface 105. It is to be noted that the same applies in the case of the second organic layer 150. Therefore, delamination is able to be made less likely to be caused between the first base electrode layer 122 and the first organic layer 140 and between the second base electrode layer 132 and the second organic layer 150 on the end surfaces. As a result, the fixing strength between the first external electrode 120 and the second external electrode 130 are ensured, thus making it possible to prevent a fall of the multilayer ceramic capacitor mounted.

In addition, in the multilayer ceramic capacitor 100 according to the present preferred embodiment of the present invention, preferably, the organic layer principal surface portion 144 of the first organic layer 140 has a surface roughness Ra of about 0.1 µm or more and about 0.5 µm or less, and the organic layer end surface portion 146 thereof has a surface roughness Ra of about 0.6 µm or more and about 2.0 µm or less, for example. It is to be noted that the same applies in the case of the second organic layer 150. Thus, while reducing, in a more reliable manner, the adhesion of the first base electrode layer 122 and the first plating layer 123 as well as the second base electrode layer 132 and the second plating layer 133 on the principal surfaces of the laminated body 110, it becomes possible to ensure the fixing strength of the first external electrode 120 and the second external electrode 130 on the end surfaces of the laminated body 110, thus further achieving the effects of improving the reliability and preventing a fall of the multilayer ceramic capacitor.

Furthermore, in the multilayer ceramic capacitor 100 according to the present preferred embodiment of the present invention, the adhesion strength between the first base electrode layer 122 of the first external electrode 120 and the laminated body 110 is preferably higher than the adhesion strength between the first organic layer 140 and the first plating layer 123 of the first external electrode 120. Likewise, the adhesion strength between the second base electrode layer 132 of the second external electrode 130 and the laminated body 110 is preferably higher than the adhesion strength between the second organic layer 150 and the second plating layer 133 of the second external electrode 130. Thus, delamination is able to be achieved respectively between the first organic layer 140 and the second organic layer 150 and the first plating layer 123 and the second plating layer 133, and the adhesion is able to be maintained between the laminated body 110 and the first organic layer 140 and the second organic layer 150, and ingress of water and the like is reliably reduced or prevented. Therefore, defects are further reduced, such as a decrease in the reliability of the multilayer ceramic capacitor 100.

In addition, in the multilayer ceramic capacitor 100 according to the present preferred embodiment of the present invention, the adhesion strength between the laminated body 110 and the first organic layer 140 is preferably higher than the adhesion strength between the first organic layer 140 and the first plating layer 123. Likewise, the adhesion strength between the laminated body 110 and the second organic layer 150 is preferably higher than the adhesion strength between the second organic layer 150 and the second plating layer 133. Thus, if a substrate is warped by a thermal shock or the like with the multilayer ceramic capacitor 100 mounted on the substrate, a stress based on the warp causes delamination between the first base electrode layer 122 and the first plating layer 123 of the first external electrode 120, and likewise, delamination between the second base electrode layer 132 and the second plating layer 133 of the second external electrode 130 in a further rational manner. Therefore, the stress is further dispersed, thus making it possible to prevent the ceramic portion and the internal electrode portion of the multilayer ceramic capacitor 100 from having any crack, deformation, or the like generated. As a result, the reliability of the multilayer ceramic capacitor 100 is further improved.

Furthermore, in the multilayer ceramic capacitor 100 according to the present preferred embodiment of the present invention, an organic silicon compound that has a structure of multifunctional alkoxysilane Si—$(C_nH_{2n+1})_3$ and includes an N element is preferably used as the first organic layer 140 and the second organic layer 150.

Thus, since the layers are reliably defined on the surfaces of the laminated body 110, the first base electrode layer 122 of the first external electrode 120, and the like, the actions of the first organic layer 140 and the second organic layer 150 effectively keep the laminated body 110 from being cracked, thus improving the reliability.

Next, a method of manufacturing the multilayer ceramic capacitor 100 according to a preferred embodiment of the present invention will be described.

First, the laminated body 110 is prepared which includes the first internal electrodes 211 and the second internal electrodes 212. Specifically, a ceramic paste including a ceramic powder is applied in the form of a sheet, for example, by a screen printing method, and dried, thus preparing mother ceramic green sheets.

Next, onto the mother ceramic green sheets, a conductive paste used for internal electrode formation is applied in a predetermined pattern, for example, by screen printing or the like, thus forming conductive patterns for the formation of internal electrodes as the first internal electrodes 211. Likewise, onto others of the mother ceramic green sheets, a conductive paste used for internal electrode formation is applied in a predetermined pattern, for example, by screen printing or the like, thus forming conductive patterns for the formation of internal electrodes as the second internal electrodes 212.

In this way, the mother ceramic green sheets with the conductive patterns for the formation of internal electrodes defining the first internal electrodes 211; the mother ceramic green sheets with the conductive patterns for the formation of internal electrodes defining the second internal electrodes 212; and the mother ceramic green sheets without any conductive pattern for the formation of internal electrodes, are provided. It is to be noted that the ceramic paste and the conductive paste used for internal electrode formation may include, for example, known binders and solvents.

Next, a mother stacked body is prepared. The mother stacked body is prepared as follows. The mother ceramic green sheets of outer layers without any conductive pattern printing used for the formation of internal electrodes are stacked to reach a predetermined number of sheets, and the mother ceramic green sheets with the conductive pattern printing used for the formation of internal electrodes as the first internal electrodes 211 and the mother ceramic green sheets with the conductive pattern printing used for the formation of internal electrodes as the second internal electrodes 212 are sequentially stacked thereon in an alternate manner. The mother ceramic green sheets of outer layers without any conductive pattern printing used for the formation of internal electrodes are further stacked thereon to reach a predetermined number of sheets, thus preparing the mother stacked body. The mother stacked body may be, if necessary, subjected to pressing in the stacking direction by any desirable method, such as isostatic pressing, for example.

Next, the mother stacked body is cut in predetermined positions, thus cutting out a plurality of raw laminated bodies 110 of a predetermined size. In this regard, the raw laminated bodies 110 may include corners and ridges rounded by barrel polishing or the like.

Next, the raw laminated bodies 110 are subjected to firing, thus providing laminated bodies 110 provided therein with first internal electrodes 211 and second internal electrodes 212, where the first internal electrodes 211 include first extended portions 211b exposed at first end surfaces 105, and the second internal electrodes 212 have second extended portions 212b exposed at second end surfaces 106. The firing temperature is set appropriately depending on the types of the ceramic material and the conductive material, and for example, set within the range of about 900° C. or higher and about 1300° C. or lower, for example.

Next, base electrode layers of external electrodes are formed on both ends of the fired laminated body 110. A conductive paste used to form external electrodes is applied to the both ends of the fired laminated body 110, and subjected to baking, thus forming the first base electrode layer 122 for the first external electrode 120 and the second base electrode layer 132 for the second external electrode 130. The baking temperature is preferably about 700° C. or higher and about 900° C. or lower, for example.

Next, the surface of the first base electrode layer 122 corresponding to the organic layer principal surface portion 144 on the first base electrode layer 122 of the first eternal electrode 120 is polished such that the surface roughness Ra of the organic layer principal surface portion 144 falls within the range of about 0.1 μm or more and about 0.5 μm or less, for example. In addition, the surface of the first base electrode layer 122 corresponding to the organic layer end surface portion 146 on the first base electrode layer 122 of the first eternal electrode 120 is polished such that the surface roughness Ra of the organic layer end surface portion 146 falls within the range of about 0.6 μm or more and about 2.0 μm or less, for example. Likewise, the second base electrode layer 132 of the second external electrode 130 is also subjected to the polishing.

Blasting is preferably used for the polishing, and the particle size, discharge pressure, and blast time of a blast material, and the like are adjusted in order to achieve targeted surface roughness. It is to be noted that as a method for polishing only the organic layer principal surface portion, laminated bodies with base electrode layers are arranged such that principal surfaces or side surfaces of the bodies serve as upper surfaces, and blast polishing is carried out from the upper surfaces. After the polishing, the chip is turned such that four surfaces of the principal surfaces and the side surfaces can be all polished. In addition, the surfaces may be polished by a method of polishing with the organic layer end surface portion subjected to masking. Further, as a method for polishing only the organic layer end surface portion, laminated bodies with base electrode layers are arranged such that end surfaces of the bodies serve as upper surfaces, and blast polishing is carried out from the upper surfaces. In addition, the surfaces may be polished by a method of polishing with the organic layer principal surface portion subjected to masking.

In addition, the polishing method may be, besides blast polishing, laser irradiation, barrel polishing, polishing with sandpaper, abrasive, whetstone, buff, or the like, or chemical polishing.

As just described, the surface roughness of the organic layer principal surface portion and the organic layer end surface portion is controlled by roughening the surfaces of the first base electrode layer 122 and the second base electrode layer 132 on which the respective organic layers are disposed.

Next, the first organic layer 140 and the second organic layer 150 are formed. The first organic layer 140 and the second organic layer 150 are prepared as follows.

The first organic layer 140 and the second organic layer 150 are preferably formed through the application of or immersion in an organic process liquid so as to cover predetermined surfaces of the first base electrode layer 122 for the first external electrode 120, of the second base electrode layer 132 for the second external electrode 130, and of the laminated body 110. In the step of forming the first organic layer 140 and the second organic layer 150, the organic process liquid is applied in two batches.

Specifically, the laminated bodies 110 with the baked first base electrode layers 122 and the second base electrode layers 132 respectively for the first external electrodes 120 and the second external electrodes 130 are arranged in the longitudinal direction, and the surfaces of the first external electrodes 120 and the second external electrodes 130 are immersed in the first organic process liquid so as to leave the ends 220 covered by the first organic layers 140 and the ends 320 covered by the second organic layers 150. Thereafter, the laminated body 110 is preferably dried at a temperature of about 100° C. or higher and about 200° C. or lower, thus forming the portion of the first organic layer 140 covering the first base electrode layer 122 and the portion of the second organic layer 150 covering the second base electrode layer 132 respectively on the surfaces of the first external electrode 120 and the second external electrode 130 so as to leave the end 220 covered by the first organic layer 140 and the end 320 covered by the second organic layer 150. The first organic process liquid is composed of a monofunctional silane coupling material, specifically with the use of decyltrimethoxysilane, n-propyltrimethoxysilane, octyltriethoxysilane, or the like, and obtained by diluting the organic process liquid with an alcohol solvent to about 3 weight % or less.

Next, for the laminated body 110, predetermined surfaces of the first base electrode layer 122 of the first external electrode 120, of the second base electrode layer 132 of the second external electrode 130, and of the laminated body 110 are immersed in the second organic process liquid. In this regard, the organic film formed from the second organic process liquid is less likely to be formed on the organic film formed from the first organic process liquid, and thus formed on the predetermined surfaces of the end 220 of the first base electrode layer 122, of the end 320 of the second base electrode layer 132, and of the laminated body 110. Thereafter, the laminated body 110 is preferably dried at a temperature of about 100° C. or higher and about 200° C. or lower, thus forming the first organic layer 140 and the second organic layer 150 so as to cover the end 220 of the first base electrode layer 122 and the end 320 of the second base electrode layer 132. The second organic process liquid is, with the use of multifunctional alkoxysilane Si—$(C_nH_{2n+1})_3$, obtained by diluting the organic process liquid with an alcohol solvent to about 1 weight % or more and about 10 weight % or less. The first organic process liquid and the second organic process liquid preferably each have an organic silicon compound.

Because the first organic process liquid is different from the second organic process liquid, the first organic layer 140 and the second organic layer 150 are formed from the first liquid on the surfaces of the first base electrode layer 122 and the second base electrode layer 132 so as to leave the end 220 and the end 320. Then, the second liquid is less likely to adhere onto the first organic layer 140 and the second organic layer 150 formed the first time, thus allowing the first organic layer 140 and the second organic layer 150 to be formed so as to increase in thickness. As a result, it becomes possible to form the first organic layer 140 adequately on the end 220 of the first base electrode layer 122 of the first external electrode 120, which serves as a starting point for a crack, and it becomes possible likewise to form the second organic layer 150 adequately on the end 320 of the second base electrode layer 132 of the second external electrode 130, which serves as a starting point for a crack, thus making it possible for the crack suppression effect of preferred embodiments of the present invention to be more significant.

Next, plating layers of external electrodes are formed on both ends of the laminated body 110. The first plating layer 123 for the first external electrode 120 is preferably formed to cover almost all of the surface of the first base electrode layer 122 for the first external electrode 120, and the end surface of the end 230 of the first plating layer 123 is preferably formed to cover the surface of one end 140a of the first organic layer 140. Likewise, the second plating layer 133 for the second external electrode 130 is preferably formed to cover almost all of the surface of the second base electrode layer 132 for the second external electrode 130, and the end surface of the end 330 of the second plating layer 133 is preferably formed to cover the surface of one end 150a of the second organic layer 150.

Next, portions of the first organic layer 140 and the second organic layer 150 may be partially removed, if necessary.

The foregoing method can easily manufacture the multilayer ceramic capacitor 100 which prevents the ceramic portion and the internal electrode portion of the laminated body 110 from having any cracks, deformation, or the like generated, thus improving the performance and the reliability.

Experimental Example

An experimental example will be described below which was provided to confirm the advantageous effects of preferred embodiments of the present invention.

In the present experimental example, the multilayer ceramic capacitor 100 was prepared by the manufacturing method according to the preferred embodiment mentioned previously, and subjected to a thermal stress, the crack generation rate, the fixing strength, the number of multilayer ceramic capacitor deviations generated, and the number of solderability defects generated were then checked.

The present experimental example was provided in the case of varying the surface roughness Ra of the organic layer principal surface portion with the surface roughness Ra of the organic layer end surface portion kept constant, and in the case of varying the surface roughness Ra of the organic layer end surface portion with the surface roughness Ra of the organic layer principal surface portion kept constant.

Here are the example specifications of the multilayer ceramic capacitor 100:
  Size: Length L: 1.0 mm, Width W: 0.5 mm, Height H: 0.5 mm
  Ceramic Material: $BaTiO_3$
  Capacitance: 100 nF
  Rated Voltage: 16 V
Here are the example specifications of the first external electrode 120 and the second external electrode 130:
  Base Electrode Layer: Material including Conductive Metal (Cu) and Glass Component
  Thickness of Base Electrode Layer: 30 μm at Central portion of End Surface
  Organic Layer
    Portion formed on Surface of Base Electrode Layer: Monofunctional Silane Coupling Film of Decyltrimethoxysilane, with Thickness of 30 nm
    Portion formed on End of Base Electrode Layer and Surface of Laminated Body: Multifunctional Alkoxysilane Si—$(C_nH_{2n+1})_3$ of Tris-(Trimethoxysilylpropyl)Isocyanurate
  Surface Roughness Ra of Organic Layer Principal Surface portion: See Table 1 and Table 2
  Surface Roughness Ra of Organic Layer End Surface portion: See Table 1 and Table 2
  Plating Layer: Two Layers of Ni Plating layer (3 μm)+Sn plating Layer (3 μm)

The method of measuring the surface roughness for the organic layer principal surface portion and the organic layer end surface portion was provided as follows in the present experimental example.

The surface roughness was measured in the multilayer ceramic capacitor with the plating layers being formed. Cross-section polishing was carried out from the surface in a direction perpendicular to the substrate mounting surface, that is, the first side surface or the second side surface to a central portion (located at half the width W) of the multilayer ceramic capacitor, and an image of the polished cross section was captured with an SEM (electron microscope). Thereafter, the curve of the geometry between the organic layer and the plating layer was extracted from the captured image, and the arithmetic roughness was calculated with a reference length (measurement range) of 50 μm. It is to be noted that a central portion of the first organic layer or second organic layer located at the both principal surfaces or both side surfaces of the laminated body 110 was adopted as a site for the measurement of the surface roughness Ra of the organic layer principal surface portion, and a central portion of the first organic layer or second organic layer located at the both end surfaces of the laminated body 110 was adopted as a site for the measurement of the surface roughness Ra of the organic layer end surface portion.

The surface roughness Ra for the organic layer principal surface portion and the organic layer end surface portion was varied by varying each of the center particle size of a blast material and the sandblasting time as shown in Tables 1 and 2.

Here is the test method: The multilayer ceramic capacitor 100 was mounted by applying an LF solder paste of 150 μm in thickness to a JEITA-land FR4 substrate of 1.6 mm in thickness, then placing the multilayer ceramic capacitor 100 thereon, and passing the substrate through a reflow furnace at 240° C. five times. In this regard, whether there was a fall of the multilayer ceramic capacitor from the substrate or not was confirmed. The number of multilayer ceramic capacitors mounted is 100 for every type.

Here is a method for measuring the crack generation rate: The mounted multilayer ceramic capacitors were placed on a hot plate at 240° C. to melt the solder, thus removing the multilayer ceramic capacitor from the substrate. Next, cross-section polishing was carried out from the surface in a direction that intersects at right angles with the mounting surface of the substrate, that is, the first side surface or the second side surface to a central portion (located at half the width W) of the multilayer ceramic capacitor, and thereafter, the polished cross section was observed with an SEM (electron microscope), while focusing on a crack developed from the outer layer portion toward the internal electrode layer part with an external electrode end as a starting point.

Here is a method for evaluation of the fixing strength: the multilayer ceramic capacitor was mounted on a JEITA-land FR4 substrate of about 1.6 mm in thickness with the use of an LF solder paste, a processing jig was then pressed against a central portion of the side surface of the multilayer ceramic capacitor with the substrate fixed, a load was applied in the direction of connecting the both side surfaces so as to be parallel to the substrate, and the maximum load value to breakdown was obtained and evaluated. It is to be noted that the number of multilayer ceramic capacitors for the fixing strength is also 100 for every type.

Here is a method for evaluation of defective solderability: the multilayer ceramic capacitor with a flux applied thereto was immersed for 2 seconds in a solder bath of an LF solder heated to 245° C., and pulled up. After the pull-up, the side of the multilayer ceramic capacitor closer to the end surface was observed with a stereoscopic microscope, the exposed base electrode layer was determined to be a defective, and as for the multilayer ceramic capacitor with the base electrode layer unexposed, the multilayer ceramic capacitor where about 95% of the base electrode layer was covered with the solder was determined to be a non-defective product, and the multilayer ceramic capacitor where less than about 95% of the base electrode layer was covered with the solder was determined to be a defective product.

Table 1 shows therein the results in the case of varying the surface roughness Ra of the organic layer principal surface portion with the surface roughness Ra of the organic layer end surface portion kept constant, and Table 2 shows therein the results in the case of varying the surface roughness Ra of the organic layer end surface portion with the surface roughness Ra of the organic layer principal surface portion kept constant.

TABLE 1

| Center Particle Size of Blast Material (μm) | 40 | | | | 60 |
|---|---|---|---|---|---|
| Sandblasting Time (min) | 30 | 10 | 30 | 10 | 0 |
| Surface Roughness Ra of Organic Layer Principal Surface portion (μm) | 0.05 | 0.1 | 0.3 | 0.5 | 0.65 |
| Surface Roughness Ra of Organic Layer End Surface portion (μm) | | | 0.65 | | |
| Crack Generation Rate (%) | 0 | 0 | 0 | 0 | 72 |
| Fixing Strength (N) | 6 | 10 | 12 | 13 | 16 |
| The Number of Multilayer Ceramic Capacitor Falls Generated | 2/100 | 0/100 | 0/100 | 0/100 | 0/100 |
| The Number of Solderability Defects Generated | 0/100 | 0/100 | 0/100 | 0/100 | 0/100 |

TABLE 2

| Center Particle Size of Blast Material (μm) | 60 | | 100 | | 150 | 150 |
|---|---|---|---|---|---|---|
| Sandblasting Time (min) | 10 | 5 | 10 | 20 | 10 | 20 |
| Surface Roughness Ra of Organic Layer Principal Surface portion (μm) | | | 0.3 | | | |
| Surface Roughness Ra of Organic Layer End Surface portion (μm) | 0.5 | 0.6 | 1.0 | 1.5 | 2.0 | 2.5 |
| Crack Generation Rate (%) | 0 | 0 | 0 | 0 | 0 | 0 |
| Fixing Strength (N) | 12 | 13 | 11 | 13 | 14 | 13 |

TABLE 2-continued

| The Number of Multilayer Ceramic Capacitor Falls Generated | 3/100 | 0/100 | 0/100 | 0/100 | 0/100 | 0/100 |
|---|---|---|---|---|---|---|
| The Number of Solderability Defects Generated | 0/100 | 0/100 | 0/100 | 0/100 | 0/100 | 7/100 |

Table 1 shows the results for the case of varying the surface roughness Ra of the organic layer principal surface portion to about 0.05 μm, about 0.1 μm, about 0.3 μm, about 0.5 μm, and about 0.65 μm with the surface roughness Ra of the organic layer end surface portion kept constant at about 0.65 μm. In this case, when the surface roughness Ra of the organic layer principal surface portion was about 0.65 μm, the crack generation was found to be about 72%, and no crack generation was found in the case of about 0.5 μm or less. However, when the surface roughness Ra of the organic layer principal surface portion was about 0.05 μm, the multilayer ceramic capacitor fell down after the mounting. From the foregoing, it has been confirmed that the multilayer ceramic capacitors are favorable where the surface roughness Ra of the organic layer principal surface portion is about 0.1 μm or more and about 0.5 μm or less. Further, it has been confirmed that the fixing strength is higher as the surface roughness Ra of the organic layer principal surface portion is increased.

Table 2 shows the results for the case of varying the surface roughness Ra of the organic layer end surface portion to about 0.5 μm, about 0.6 μm, about 1.0 μm, about 1.5 μm, about 2.0 μm, and about 2.5 μm with the surface roughness Ra of the organic layer principal surface portion kept constant at about 0.3 μm. In this case, no crack generation was found on any condition. However, when the surface roughness Ra of the organic layer end surface portion was about 0.5 μm, the multilayer ceramic capacitor fell down after the mounting. In addition, when the surface roughness Ra of the organic layer end surface portion was about 2.5 μm, defective solderability was produced. From the foregoing, it has been confirmed that the multilayer ceramic capacitors are favorable where the surface roughness Ra of the organic layer end surface portion is about 0.6 μm or more and about 2.0 μm or less, for example. It is to be noted that the fixing strength was not found to change significantly even when the surface roughness Ra of the organic layer end surface portion was varied.

From the foregoing results, the advantageous effect achieved by preferred embodiments of the present invention has been confirmed successfully.

In the descriptions of the preferred embodiments described above, the configurations which can be combined may be combined with each other. The preferred embodiments disclosed herein should be considered by way of example in all respects, and non-limiting. The scope of the present invention is defined by the claims, but not by the foregoing descriptions, and intended to encompass all of modifications within the spirit and scope equivalent to the claims.

Figure 4:
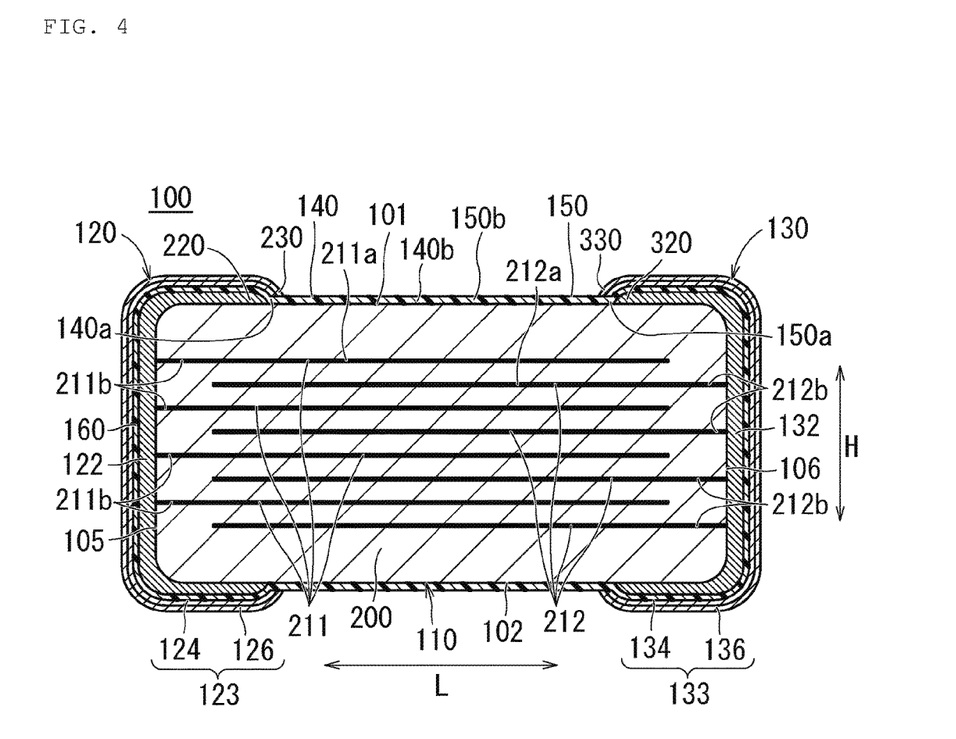
FIG. 4 is a cross-sectional view illustrating a modification example of a multilayer ceramic electronic component according to a preferred embodiment of the present invention.

For example, in the case of the preferred embodiments described above, there is a portion without any organic layer between the first external electrode 120 and the second external electrode 130 of the multilayer ceramic capacitor 100. However, as shown in FIG. 4, the organic layers may be disposed on the entire exposed surface of the laminated body 110 between the first external electrode 120 and second external electrode 130, in such a way that the other end 140*b* of the first organic layer 140 extends to a central portion of the laminated body 110, and the other end 150*b* of the second organic layer 150 extends to the central portion of the laminated body 110, thus both forming a joint at the central portion.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic electronic component comprising:
a laminated body including:
a plurality of laminated dielectric layers and a plurality of laminated internal electrodes;
a first principal surface and a second principal surface opposite to one another in a laminating direction;
a first side surface and a second side surface opposite to one another in a width direction perpendicular to the laminating direction; and
a first end surface and a second end surface opposite to one another in a length direction perpendicular to the laminating direction and the width direction;
a first external electrode connected to the plurality of laminated internal electrodes, and disposed on the first end surface, with an end extending on the first principal surface, the second principal surface, the first side surface, and the second side surface;
a second external electrode connected to the plurality of laminated internal electrodes, and disposed on the second end surface, with an end extending on the first principal surface, the second principal surface, the first side surface, and the second side surface; wherein
the first external electrode includes a first base electrode layer including a conductive metal and a glass component, a first organic layer including an organic silicon compound, disposed to cover the first base electrode layer, and a first plating layer disposed on the first organic layer;
the second external electrode includes a second base electrode layer including a conductive metal and a glass component, a second organic layer including an organic silicon compound, disposed to cover the second base electrode layer, and a second plating layer disposed on the second organic layer;
the first organic layer is disposed to cover from the first base electrode layer to at least a portion of a surface of the laminated body, and the second organic layer is disposed to cover from the second base electrode layer to at least a portion of a surface of the laminated body;
a leading end of the first plating layer is in contact with the first organic layer, and a leading end of the second plating layer is in contact with the second organic layer; and
when the first organic layer disposed on the first base electrode layer located on the first principal surface or the second principal surface, or the second organic layer disposed on the second base electrode layer located thereon, is referred to as an organic layer of a principal surface portion, and the first organic layer disposed on the first base electrode layer located on the first end surface or the second end surface, or the second organic layer disposed on the second base electrode layer located thereon, is referred to as an organic layer of an end surface portion, a surface roughness of the organic layer of the end surface portion is larger than a surface roughness of the organic layer of the principal surface portion.

2. The multilayer ceramic electronic component according to claim 1, wherein the organic layer of the principal surface portion has a surface roughness Ra of about 0.1 µm or more and about 0.5 µm or less, and the organic layer of the end surface portion has a surface roughness Ra of about 0.6 µm or more and about 2.0 µm or less.

3. The multilayer ceramic electronic component according to of claim 1, wherein
an adhesion strength between the laminated body and the first base electrode layer is higher than an adhesion strength between the first organic layer and the first plating layer; and
an adhesion strength between the laminated body and the second base electrode layer is higher than an adhesion strength between the second organic layer and the second plating layer.

4. The multilayer ceramic electronic component according to claim 1, wherein
an adhesion strength between the laminated body and the first organic layer is higher than an adhesion strength between the first organic layer and the first plating layer; and
an adhesion strength between the laminated body and the second organic layer is higher than an adhesion strength between the second organic layer and the second plating layer.

5. The multilayer ceramic electronic component according to claim 1, wherein the first organic layer and the second organic layer include an organic silicon compound that includes a structure of multifunctional alkoxysilane Si—$(C_nH_{2n+1})_3$, and includes an N element.

6. The multilayer ceramic electronic component according to claim 1, wherein an atomic concentration of Si to Cu is about 1% or more and about 5% or less between a Cu concentration and an Si concentration at surfaces of the first organic layer and of the second organic layer.

7. The multilayer ceramic electronic component according to claim 1, wherein the multilayer ceramic electronic component is a multilayer ceramic capacitor.

8. The multilayer ceramic electronic component according to claim 1, wherein the first plating layer includes multiple layers and the second plating layer includes multiple layers.

9. The multilayer ceramic electronic component according to claim 8, wherein
the multiple layers of the first plating layer include plating layers made of at least one selected from Cu, Ni, Ag, Pd, Ag—Pd alloy, Au, and Sn; and
the multiple layers of the second plating layer include plating layers made of at least one selected from Cu, Ni, Ag, Pd, Ag—Pd alloy, Au, and Sn.

10. The multilayer ceramic electronic component according to claim 8, wherein
the multiple layers of the first plating layer include a first Ni plating layer and a first Sn plating layer; and
the multiple layers of the second plating layer include a second Ni plating layer and a second Sn plating layer.

11. The multilayer ceramic electronic component according to claim 8, wherein
the multiple layers of the first plating layer each include leading edges which are in contact with a surface of the first organic layer; and
the multiple layers of the second plating layer each include leading edges which are in contact with a surface of the second organic layer.

12. The multilayer ceramic electronic component according to claim 8, wherein
the multiple layers of the first plating layer each have a thickness of about 1 μm or more and about 15 μm or less; and
the multiple layers of the second plating layer each have a thickness of about 1 μm or more and about 15 μm or less.

13. The multilayer ceramic electronic component according to claim 1, wherein a gap is provided between the first organic layer and the second organic layer such that a portion of the principal surface is exposed.

14. The multilayer ceramic electronic component according to claim 13, wherein the first organic layer and the second organic layer include an organic silicon compound that includes a structure of multifunctional alkoxysilane Si—$(C_nH_{2n+1})_3$, and includes an N element.

15. The multilayer ceramic electronic component according to claim 1, wherein the first organic layer and the second organic layer contact one another such that no portion of the principal surface is exposed.

16. The multilayer ceramic electronic component according to claim 15, wherein the first organic layer and the second organic layer include an organic silicon compound that includes a structure of multifunctional alkoxysilane Si—$(C_nH_{2n+1})_3$, and includes an N element.

17. The multilayer ceramic electronic component according to claim 1, wherein
a portion of the first organic layer in contact with the laminated body has a dimension in a length direction of a leading end of the first base electrode layer to a leading end of the first organic layer of about 5 μm or more and about 100 μm or less; and
a portion of the second organic layer in contact with the laminated body has a dimension in the length direction of a leading end of the second base electrode layer to a leading end of the second organic layer of about 5 μm or more and about 100 μm or less.

18. The multilayer ceramic electronic component according to claim 1, wherein
the plurality of laminated internal electrodes include first internal electrodes and second internal electrodes which are opposed to one another;
the first internal electrodes being directly electrically connected to only the first base electrode layer and the second internal electrodes being directly electrically connected to only the second base electrode layer.

19. The multilayer ceramic electronic component according to claim 1, wherein
the first internal electrodes each include, as viewed from the laminating direction, a rectangular or substantially rectangular first opposite portion and a first extended portion extended from the first opposite portion to the first end surface of the laminated body, the first extended portion including an end surface exposed at the first end surface; and
the second internal electrodes each include, as viewed from the laminating direction, a rectangular or substantially rectangular second opposite portion and a second extended portion extended from the second opposite portion to the second end surface of the laminated body, the second extended portion including an end surface exposed at the second end surface.

20. The multilayer ceramic electronic component according to claim 1, wherein each of the plurality of laminated dielectric layers is made from a dielectric ceramic material including:
at least one of $BaTiO_3$, $CaTiO_3$, $SrTiO_3$, $CaZrO_3$, $PbTiO_3$, or $Pb(Zr,Ti)O_3$ as a main constituent; and
at least one of an Mn compound, an Fe compound, a Cr compound, a Co compound, or an Ni compound as an accessory constituent.

* * * * *